Patented Dec. 9, 1952

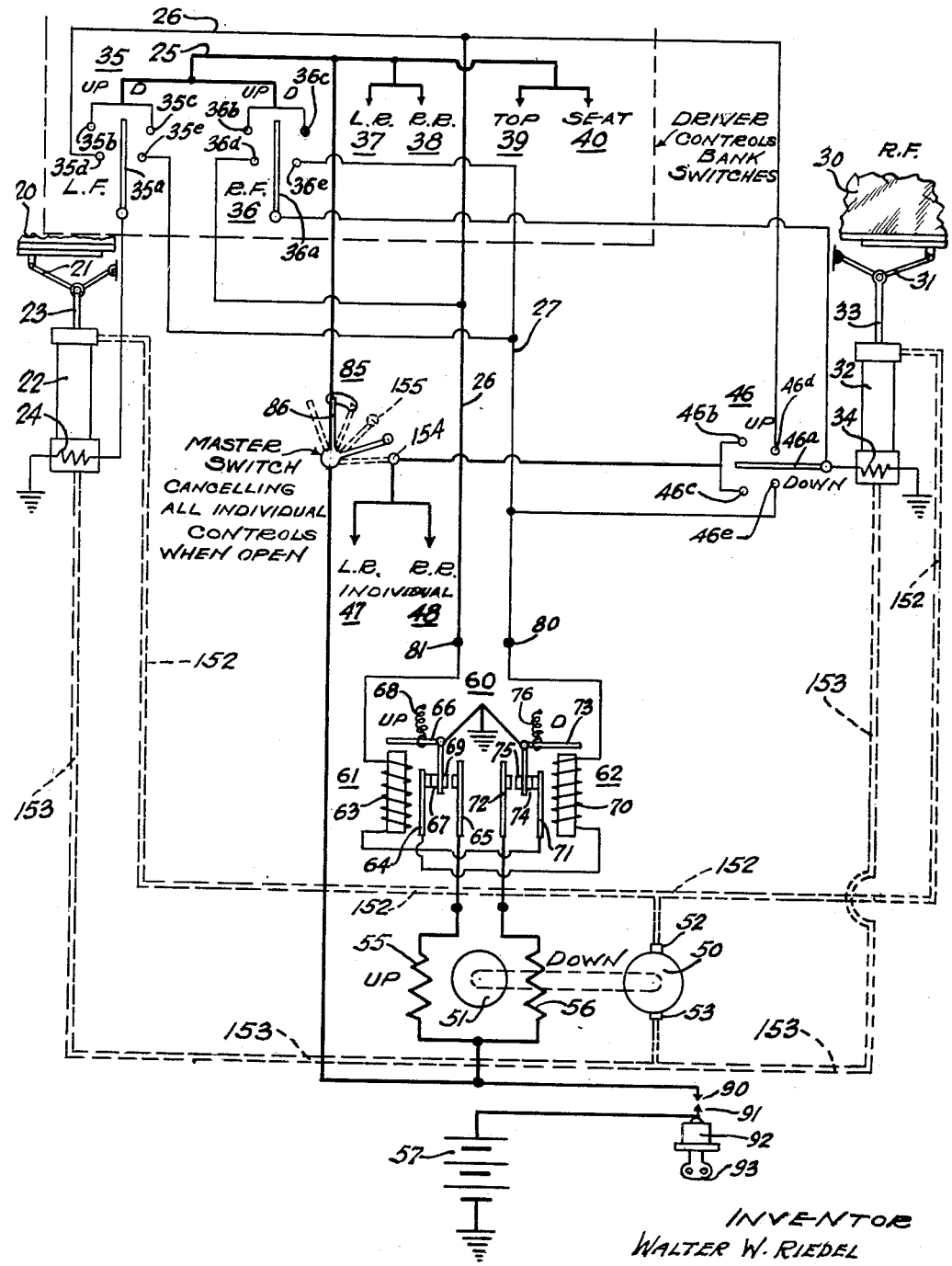

2,621,037

UNITED STATES PATENT OFFICE 2,621,037

WINDOW ACTUATOR CONTROL

Walter W. Riedel, Dayton, Ohio, assignor to General Motors Corporation, Detroit, Mich., a corporation of Delaware Application August 26, 1950, Serial No. 181,640

5 Claims. (Cl. 268—20)

This invention relates to improvements in control apparatus for window, top and seat actuating mechanisms in automotive vehicles.

Some automotive vehicles are equipped with power driven window and top actuating mechanisms controlled from a remote point. Such equipment provides some control means accessible to the driver of the vehicle whereby all the windows and top of the vehicle can be operated by the driver. Additional control means are provided, which are accessible to the respective passengers, and by means of which each passenger may operate the individual, adjacent window. Thus, while the driver is operating the vehicle, or at any time, any person therein may adjust a window by actuating the control device provided adjacent said window to be adjusted.

Safely operating an automotive vehicle through busy city traffic or at higher speeds over highways in the open country requires the complete attention of the driver and he has little or no time to check on the activities of his passengers in the rear compartment of the vehicle. This may prove extremely undesirable if not dangerous especially if such passengers are children and enticing gadgets in the form of control devices are available, operation of which by the curious child, opens a window through which the now venturesome child may climb and be hurled from the fast running vehicle to the highway or, in the city, into the path of other moving vehicles. The driver, concentrating on the piloting of the vehicle, may not observe such action by his juvenile passengers and thus, an accessory of convenience in his vehicle may turn out to be the means of accident or even tragedy.

It is among the objects of the present invention to provide a system for automatic window and top operation with control means for and accessible only to the driver of the vehicle, said control means being operative by the driver for rendering all window actuator controls inoperative and ineffective excepting his own, whereby only the driver may actuate the vehicle windows and the passengers may not, even though they operate the controls available to them.

Another undesirable factor in the present window and top actuating systems is the possibility of unauthorized operation of the system tending to battery depletion. The automatic raising and lowering of the vehicle windows and top is intriguing and very often a vehicle equipped with one of these window and top actuating systems and parked in a garage offers an interesting mechanism oft repeated operations of which will discharge and completely deplete the battery, thus preventing vehicle operation.

A further object of the present invention is to prevent unauthorized operation of the system. This is accomplished by providing a separate switch for the operator or owner of the vehicle which may be moved to open completely the circuits leading to all actuators of the system. This same switch may be designed and constructed so that in one of its operated positions it opens all circuits, in a second position, it closes the circuits to the driver control switches only and maintains the passengers' switches inoperative and in the third position, all control switches, both driver's and passengers' are rendered operative. Another manner of accomplishing this object of unauthorized operation is to provide a switch in the battery circuit, this switch being associated with the key controlled ignition switch of the vehicle so that insertion of the key into the ignition switch is necessary to close the circuit which will render the system or more particularly the driver's controls of the system effective.

Further objects and advantages of the present invention will be apparent from the following description, reference being had to the accompanying drawing, wherein a preferred embodiment of the present invention is clearly shown.

In the drawing:

The single figure in the drawing illustrates the system embodying the present invention in diagrammatic form.

The system is designed and constructed to raise and lower the windows and top of an automotive vehicle and in some cases adjust the driver's seat forwardly or rearwardly. Other closure members such as the engine hood and trunk compartment lid may also be equipped with automatic actuators. For purposes of this description, let it be assumed that the system is applied to a convertible automobile which has four door windows and a top all capable of being raised and lowered. The letters L. F. in the drawing indicate the left front door, R. F., the right front door, L. R., the left rear door and R. R., the right rear door, the latter two doors being in the rear passenger compartment of the vehicle.

For purposes of simplicity and brevity only portions of the left and right front door windows are illustrated, the remaining door windows, top and seat controls being indicated inasmuch as they are identical with the controls for the left and right front doors.

The L. F. door and its window are aside the vehicle driver's seat. The R. F. door and its window are aside the passenger's seat alongside the driver. The numeral 20 indicates the L. F. door window which is adapted to be raised and lowered by the lever mechanism 21. The actuator 22, in the form of an hydraulic cylinder, has a piston actuated rod 23 extending therefrom, said rod being mechanically attached to the lever mechanism 21. Introduction of fluid into the upper end of actuator 22 forces the piston and its rod 23 downwardly causing the leverage 21 to lower window 20. If fluid pressure is directed into the bottom end of the actuator 22, then the piston and its rod 23 is moved upwardly to raise the windows 20. In order to trap the fluid within the actuator 22 so that it rigidly holds the window 20 in any adjusted position between fully up or down positions, a normally closed but electrically opened valve is provided at the lower end of the actuator, this valve being indicated by the winding 24 which is the eelctrical element of the ordinary, standard valve provided, connectible with other electrical devices of the system.

The R. F. door window is indicated by the numeral 30. Leverage 31 is operative to raise and lower this window and actuator 32 with its piston operated rod 33 actuates the leverage 31. The valve at the bottom of actuator 32 is opened by the electromagnet 34. Like actuator 22, this actuator 32 is energized to lower or raise window 30 by the introduction of fluid under pressure into the upper or lower ends thereof respectively.

The actuators for all of the windows, the top and the seat are primarily under the control of the driver of the vehicle. For this purpose a bank of switches 35, 36, 37, 38, 39 and 40 are grouped within easy reach of the driver. All of these switches are substantially like. Swith 35 has a manually operable bridging contact 35a, electrically connected to one end of the electromagnet winding 24 of actuator 22, the opposite end of said winding being grounded. Two interconnected stationary terminal contacts 35b and 35c are electrically connected to the common line 25. A contact terminal 35d, engageable by the bridging contact 35a when it is moved out of normal position as shown in the drawing, into engagement with terminal contact 35b, is electrically connected to the line 26. When the bridging contact 35a is moved out of normal position into engagement with terminal contact 35c, it also engages terminal contact 35e electrically connected to the line 27.

The driver's switch 36 for controlling the window 30 in the right front door has interconnected terminal contacts 36b and 36c adapted to be engaged by movable bridging contact 36a when it is moved out of normal position in one direction or the other respectively. At the same time contact 36a engages terminal contacts 36d and 36e respectively. The bank of switches for the driver's sole use and referred to by the numerals 37, 38, 39 and 40 are all identical with the switches 35 and 36 just described and when operated, control the actuation of the left-rear and the right-rear windows and the top and seat respectively.

The right-front, left-rear and right-rear windows are also operable by the actuation of switches 46, 47 and 48 respectively, these switches being accessible to the passengers occupying seats alongside said windows. These switches are the same as switches 35 and 36. For instance switch 46 has a movable contact 46a, electrically connected to contact 36a of switch 36 and to the electromagnet 34 of the valve in actuator 32. Two interconnected terminal contacts 46b and 46c are engageable by contact 46a. When contact 46a engages contact 46b, another stationary contact 46d is engaged and when contact 46b engages contact 46c another contact 46e is engaged. Similar switches 47 and 48 are provided at the locations marked L. R. and R. R. respectively.

All of the actuators of the system are fluid pressure operated. This fluid pressure is provided by a pump 50 effective in either direction and connected to the electric motor 51 so as to be driven thereby. Pump 50 has two ports 52 and 53. When the reversible electric motor 51 drives the pump in one direction, port 52 is the fluid intake and port 53, the fluid discharge port. On the other hand when pump 50 is rotated in the opposite direction, port 52 acts as discharge and port 53 as the intake port. Pump port 52 is connected by conduits 152 with the top ends of all the actuators so that when port 52 acts as the fluid discharge port, fluid pressure is directed to all actuators tending to move their respective piston rods inwardly of the respective fluid motors which, if the fluid motor is rendered active, results in the window lowering cycle. Similar conduits 153 connect port 53 with the opposite or lower ends of all actuators.

Electric motor 51 has two windings 55 and 56, one end of each being connected together and to the source of electric power, a storage battery 57, one side of which is grounded. The electric motor is dominated by an electromagnetically operated controller 60 consisting of two companion relay switches 61 and 62. Relay 61 has an electromagnet 63. Two spaced stationary contacts 64 and 65 have one arm of a contact carrying armature 66 extending therebetween, the contact 67 on the armature being normally held in engagement with contact 64 by spring 68 which yieldably holds the armature 66 away from the electromagnet 63. The contact 69 on the armature 66 is thus normally disengaged from contact 65, but may be moved to engage said contact 65 when the electromagnet 63 is energized to attract and move the armature 66 against the effect of spring 68 at the same time separating contacts 67 and 64. Relay switch 62, like relay 61, has an electromagnet 70 and two spaced stationary contacts 71 and 72. The armature 73 has two oppositely disposed contacts 74 and 75, the contact 74 normally engaging contact 71 under the influence of spring 76 urging the armature 73 away from the electromagnet 70. Contact 75 on the armature engages contact 72 when energization of the magnet 70 moves the armature 73 to separate contacts 74 and 71. Stationary contacts 65 and 72 are electrically connected to the respective motor windings 55 and 56. The stationary contact 64 of relay switch 61 has the one end of the winding of electromagnet 70 connected thereto, the other end of this winding being connected to the controller terminal 80 which has the line 27 connected thereto. A similar controller terminal 81 connected to the line 26, has one end of the winding of electromagnet 63 connected thereto, the other end of said winding being electrically connected to the stationary contact 71 of relay switch 62. Both armatures 66 and 73 are electrically grounded.

To accomplish the objects of the present invention, a master control switch 85 is provided, said switch being only accessible to the driver of the vehicle, preferably alongside or forming a unit of the bank of switches including switches 35 to 40. One type of switch 85 consists of a manually movable contact 86, selectively movable by the driver into either one of two positions. This contact 86 is connected to the side of the battery 57 connected with the motor 51. In one position, an arm of the switch closes the circuit between the battery 57 and the line 25 leading to the driver's control switches 35 to 40. In this one position of the master switch contact 86, the passenger control switches 46, 47 and 48 are not connected with the battery and therefore they are ineffective, even when operated, to effect motor operation for actuating windows. However, when the master switch contact 86 is moved into its second position, one portion of said contact 86 will engage terminal 154, connecting the battery with the passenger control switches 46, 47 and 48 while at the same time, the contact 86 remains in electrical connection with the conduit leading to the line 25 connected to the driver's switches. When the master switches contact 86 is in this second position all control switches, the driver's and the passengers' are capable, when actuated properly, to effect motor operation. In certain cases and if desirable, master switch contact 86 may have a normal complete off position 155 in which all switches, both driver's and passengers' are completely disconnected from the battery and thus automatic actuation of the vehicle windows, top and seat is not possible.

An object of the present invention is to prevent unauthorized operation of the automatic windows, top and seat operating system. The system thus far described permits useless and battery depleting operation of the system as for instance when the vehicle is parked in a garage and not in use. To prevent such operation of the system, a make and break device is connected in the circuit between the battery and its line connections with the motor 51 and control switches of the system. This make and break device comprises two cooperating, normally disengaged contacts 90 and 91, that are provided in or on the ignition switch 92 of the vehicle. The ignition switch is locked and operated by a key 93. This key is removable from the ignition switch 92 when said switch is locked in its circuit open position. The key is of sufficient length and contact 91 is so arranged in or on the switch 92 that insertion of the key will cause contacts 91 and 90 to be engaged and complete the connection between the battery 57 and lead wires to the motor and control switches, thereby rendering the system operative without closing the ignition circuit.

Inasmuch as all control switches function alike only one, the driver's switch 36, controlling the right front door window will be described. Supposing the driver wishes to lower window 30 in the right front door, he actuates switch 36 so that its movable contact 36a engages contacts 36c and 36e. This closes the circuit including the electromagnet 34 of the valve in actuator 32 and opens said valve to permit fluid flow to and from said actuator. It also closes the circuit through wire 27, terminal 80, switch magnet winding 70, across contacts 64 and 67 through ground back to the battery, the circuit from the other side of the battery to the terminal 36c having been previously completed by the closing of contacts 91—90 by insertion of the ignition switch key 93 and movement of the master switch 85 to the full line position as shown in the drawing. When the switch magnet 70 is energized armature 73 is attracted and moved to cause contact 75 to engage contact 72 at which time the circuit through the motor winding 56 is completed and the electric motor 51 will operate to drive pump 50 so that it will deliver fluid under pressure from its port 52 through the conduit 152 shown in dotted lines, to the actuator 32 for operating it to lower the window 30. Fluid discharged from the actuator 32 during this operation returns to the pump intake port 53 via the conduit 153.

To raise window 30, the driver reverses the operation of switch contact 36a so that it engages contacts 36b and 36d. This energizes and opens the actuator valve as before and at the same time energizes the magnet switch 61 so that the winding 55 of the electric motor is energized, causing the motor to operate in the opposite direction and thus the pump 50 is rotated to deliver fluid under pressure from its port 53 through conduit 153 to the lower end of the actuator 32 which results in its actuation of the window to its closed position. All the other driver's switches 35, 37, 38, 39 and 40 operate in the same manner to effect actuation of their respective actuators.

As long as the master switch 85 is in the position as shown in full lines in the drawing, the passenger switch 46 for window actuator 32 will be out of circuit and ineffective if moved into either of its circuit closing positions. However, when the master switch 85 is actuated by the driver so that its one portion engages the terminal 154, the switch 46 as well as the other switches 47 and 48, accessible to the vehicle passengers, will be rendered effective to cause operation of their respective actuators, provided, of course, that other control switches are not concurrently in operation to effect rotation of the motor in the opposite direction. More specifically, electromagnetic switches 61 and 62, as shown, are dependent, that is, when one is energized by a circuit passing through closed contacts of the other switch, said one opens the contacts which must necessarily be closed to render said other switch operative. For instance when switch 61 is energized, its circuit passes through normally engaging contacts 71—74 of deenergized switch 62, and contacts 64—67 of switch 61 are at that time disengaged. If at this time a control switch is actuated either by the driver or a passenger to energize switch 62 for opposite motor operation, said switch 62 will remain inoperative as long as contacts 64—67 of the energized switch 61 remain open. Thus it will be seen that only one of switches 61 or 62 may be energized and during that time the other remains inoperative.

The present invention thus provides a control mechanism for the vehicle windows, top and seat which, at the will of the vehicle driver, may be placed under his sole control, thereby preventing operation of the windows especially under undesirable circumstances.

It also prevents unauthorized operation of any element of the system by requiring the insertion of the ignition key for rendering the system operative. Thus safety to the passengers, especially children, in the vehicle and protection to the owner's property, is provided by this invention.

While the embodiment of the present invention as herein disclosed, constitutes a preferred form, it is to be understood that other forms might be adopted.

What is claimed is as follows:

1. The combination with a plurality of movable closure members each having a fluid motor connected thereto for operating it in one direction or the other, of a reversible electric motor adapted to be connected to a source of electric power; a fluid pump driven by said electric motor and communicating with the respective fluid motors for actuating them; an electromagnetically controlled switch mechanism connected to the motor and energizable to render the motor operative in one direction or the other; two separate sets of switches, each switch being connected to the source of power and to the electromagnetically controlled switch mechanism and being operative into one position for energizing said mechanism for rendering the electric motor operative in one direction and into another position for energizing said mechanism to render the electric motor operative in the other direction; and a master switch normally disconnecting all of the switches in both of said sets from the source of power for rendering both sets of switches ineffective, said master switch being operative into one position to connect the switches of both sets to the source of power and into another position to disconnect the switches of only one set from the source of power.

2. The combination with a plurality of movable closure members each having a fluid motor connected thereto for operating it in one direction or the other, of a fluid pump operative in either direction to provide fluid pressure to said fluid motors; an electric motor for driving said pump, said electric motor having two field windings connectible to a source of power for operating the motor, one in one direction, the other in the opposite direction; an electromagnetically operated controller consisting of two companion relay switches each connected to a respective motor field winding and operative to effect energization of said winding; two sets of manually operable switches, each switch being connected in circuit with the source of power and the controller and operative into one position to connect the one companion switch of the relay with said source of power and into another position to connect the second companion switch of the controller with the source of power; and a master switch connected in the power line to all switches, said master switch, in one of its positions, rendering all electrical circuits ineffective, in another of its positions rendering all electrical circuits effective and in a third position rendering the circuits to one set of manually operative switches ineffectve.

3. The combination with a plurality of movable closure members each having a fluid motor connected thereto for operating it in one direction or the other, of a fluid pump operative in either direction to provide fluid pressure to said fluid motors; an electric motor for driving said pump, said electric motor having two field windings connectible to a source of power for operating the motor, one in one direction, the other in the opposite direction; a unitary controller consisting of two interconnected and dependent, electromagnetically actuated relay switches, one connected in circuit with one motor field winding, the other with the second motor field winding; two sets of multi-pole, manually operated switches, all connected in circuit with the source of power, one pole of each switch being connected with one of said relay switches and the other pole of each switch being connected to the other of said relay switches; and a single selector switch in the circuit between the power source and all of said manually operable switches, said selector switch being operative into one position for rendering all of said manually operable switches ineffective, into another position for rendering these switches effective, and into a third position for rendering one set of these switches ineffective and the second set effective to control the electric motor.

4. A mechanism as defined in claim 3 in which each fluid motor is provided with electromagnetically actuated means connected in circuit with the source of power and with one manually operable switch of each set of said switches, said means normally rendering the fluid motor ineffective but operative, when energized, to open communication between the respective fluid motor and the fluid pump.

5. The combination with a plurality of reversible fluid motors each provided with electromagnetically actuated means normally rendering the motor inoperative; of a reversible fluid pump communicating with each fluid motor and operative to provide fluid pressure for actuating each fluid motor in one direction or the other; a reversible electric motor operatively connected to the pump for driving it, said motor having two field windings in circuit with a source of electric power, one winding, when energized, causing the motor to operate in one direction, the other winding in the opposite direction; a controller consisting of two, electrically interconnected and dependent electromagnetically controlled switches, each connected in circuit with a respective motor winding; two sets of manually operable switches all connected in circuit with the source of power and one switch of each set having one pole in circuit with the electromagnetically actuated means of one fluid motor, another pole in circuit with one controller switch and the third pole with the other controller switch; and a master switch in the circuit between the source of power and all of the manually operative switches, said master switch being selectively operative into any one of three positions, in the first of which all circuits are rendered ineffective, in the second all circuits are rendered effective and in the third, the circuits to one set of manually operative switches are rendered effective and the circuit to the other set of manually operative switches ineffective.

WALTER W. RIEDEL.

REFERENCES CITED

The following references are of record in the file of this patent:

UNITED STATES PATENTS

| Number | Name | Date |
|---|---|---|
| 758,610 | Barnum | May 3, 1904 |
| 982,913 | Whittingham | Jan. 31, 1911 |
| 2,072,389 | Stayton | Mar. 2, 1937 |
| 2,216,518 | Parsons | Oct. 1, 1940 |
| 2,276,511 | Parsons | Mar. 17, 1942 |
| 2,346,387 | Parsons | Apr. 11, 1944 |
| 2,366,790 | Horton | Jan. 9, 1945 |
| 2,425,391 | Parsons | Aug. 12, 1947 |